United States Patent Office 3,161,324
Patented Dec. 15, 1964

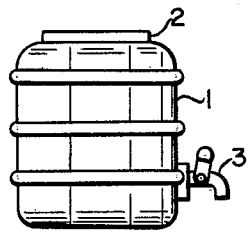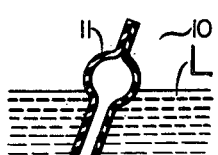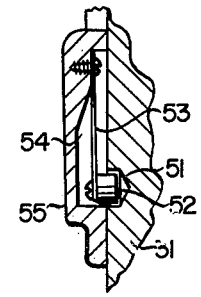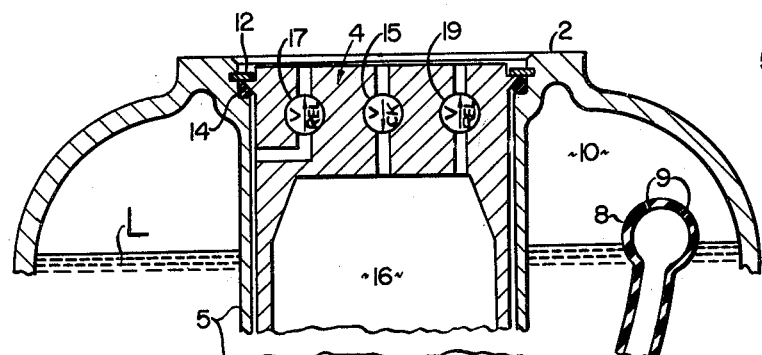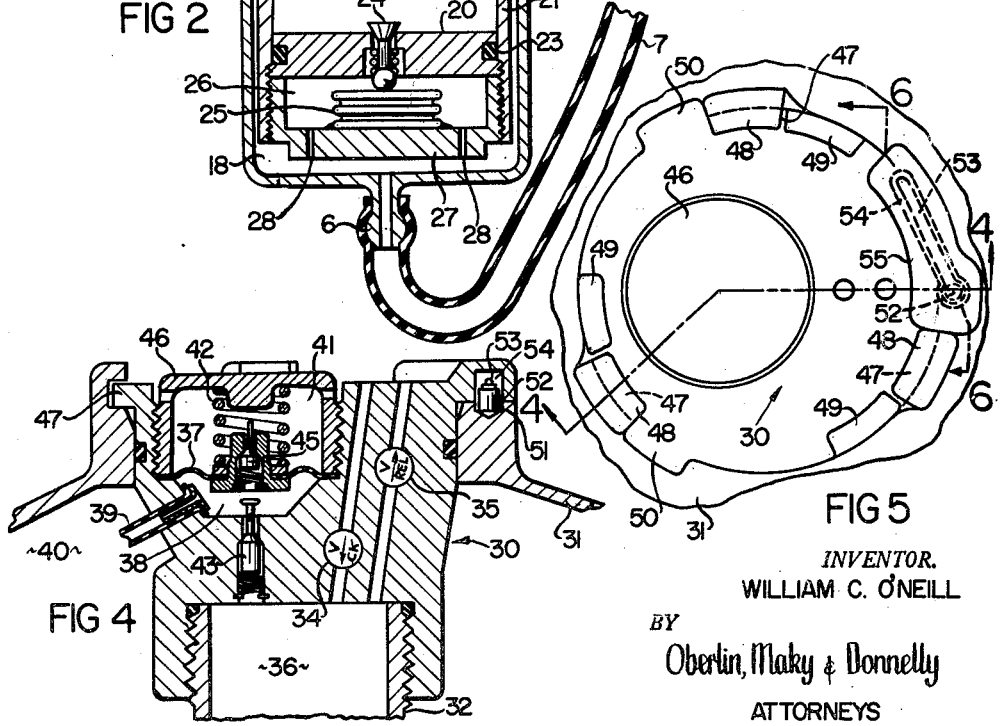

3,161,324
DISPENSING CONTAINER AND PRESSURIZER THEREFOR
William C. O'Neill, Washington, D.C., assignor to Pneumodynamics Corporation, Cleveland, Ohio, a corporation of Delaware
Filed July 20, 1961, Ser. No. 125,465
5 Claims. (Cl. 222—52)

The present invention relates generally as indicated to a dispensing container and pressurizer therefor and more particularly to a pressurized container for liquid beverages such as soda pop and beer.

At the present time there is an increasing trend to provide liquid beverages for domestic use in two to three gallon capacity containers for party use equipped with dispensing valves and dimensioned to fit in a conventional domestic refrigerator for chilling of the contents thereof. Thus, it is unnecessary to provide the usual complicated, bulky, and expensive coolers and dispensing equipment.

Accordingly, it is a principal object of this invention to provide a portable and compact dispensing container for liquids having a pressurizer inserted therein to maintain the liquid contents under desired pressure for dispensing and for preventing the contents from becoming "flat" due to escape of $CO_2$ therefrom as in the case of beverages.

It is another object of this invention to provide a dispensing container and pressurizer therefor in which the latter is kept out of contact with the liquid in the container.

It is another object of this invention to provide a dispensing container and pressurizer therefor in which the latter maintains substantially a constant pressure on the liquid in the container whether the container is full or only partly full.

It is another object of this invention to provide a dispensing container and pressurizer therefor which includes a float valve for introduction of pressurizing fluid into the container above the level of the liquid in the container and irrespective of the position of the container.

It is another object of this invention to provide a dispensing container and pressurizer therefor in which the container and pressurizer are locked together as an incident of the insertion of the pressurizer into the container.

It is yet another object of this invention to provide a dispensing container and pressurizer therefor having a novel form of pressure regulator valve therein which maintains a substantially constant desired fluid pressure head on the liquid in the container.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 1 is a side elevation view of a typical dispensing container having the pressurizer constituting the present invention inserted therein;

FIG. 2 is an enlarged fragmentary vertical cross-section view showing the upper portion of the container with the pressurizer assembled in place in the mouth of the container;

FIG. 3 is a fragmentary section of a modified type of float valve which may be employed with the pressurizer constituting the present invention;

FIG. 4 is a cross-section view of another form of pressurizer taken substantially along the line 4—4, FIG. 5;

FIG. 5 is a top plan view of the FIG. 4 pressurizer; and

FIG. 6 is a detailed cross-section view taken substantially along the line 6—6, FIG. 5 showing the means for locking together the pressurizer and the container.

Referring now more particularly to the drawings, and first to FIGS. 1, 2, and 3, the dispensing container 1 herein is of the usual reinforced construction, including a mouth 2 at the upper end and a dispensing valve 3 at one side near the bottom, a pressurizer unit 4 being inserted into said mouth 2.

The container 1 herein shown has an integral cup-shaped portion 5 to receive the pressurizer 4 and, of course, if desired, the cavity forming portion 5 may be a separate cup-shaped body of plastic or like material which is inert in the liquid L in the container 1. The lower end of the cavity forming portion 5 is formed with a nipple 6 to which is connected one end of a flexible tube 7 of rubber or rubber-like material which is inert in the liquid L and which, at its other end, has a float valve 8 provided with apertures 9 that are closed when the fluid pressure inside the tube 7 and in the chamber 10 above the level of the liquid L are equal.

As shown in FIG. 3, the float valve 11 may be of the so-called Bunsen or "Raspberry" type which again normally is closed when the pressure inside the tube 7 is substantially equal to the pressure in the chamber 10 above the liquid L level. Such float valve 8 or 11, as will be seen, precludes the liquid L in the container 1 from entering the tube 7 in all positions of the container and thus is kept out of contact with the pressurizer 4.

The pressurizer 4 as best known in FIG. 2 is secured in place in the cavity portion 5 as by means of the snap ring 12 and an O-ring 14 between opposed shoulders of the container 1 and pressurizer 4 forms a fluid tight joint.

Basically, the pressurizer 4 comprises a high pressure vessel having an inlet check valve 15 through which the chamber 16 therein is charged with high pressure fluid such as $CO_2$ under a pressure of 600 p.s.i., for example.

The pressurizer 4 is also provided with a relief valve 17 which may be set at, for example, 70 p.s.i. to relieve the chambers 18 and 10. The pressurizer has a safety relief valve 19 which may be set to relieve the high pressure chamber 16 at a pressure of say, 1050 p.s.i.

The bottom end wall of the chamber 16 may comprise a piston-like member 20 which is sealed to the wall of the pressurizer vessel or body 21 by means of the O-ring 23, said member 20 carrying a check valve 24 which is adapted to be opened by the expansible sealed bellows 25 contained in the chamber 26 formed between the piston-like member 20 and the end cap 27 that has screw-threaded engagement with body 21.

In the case of a dispensing container 1 for beer, for example, it is desired to maintain a $CO_2$ pressure of about 12 to 14 p.s.i. in chamber 10, the bellows 25 being arranged to expand to open the valve 24 whenever the pressure in the container chamber 10, in the tube 7, in the chamber 18, and in the bellows chamber 26, decreases to a value less than such desired pressure. When the valve 24 is thus opened, $CO_2$ in the high pressure chamber 16 will flow through the bellows chamber 26, the apertures 28 in the member 27, the flexible tube 7, the apertures 9 of the float valve 8 or 11 into the chamber 10 above the level of the beer in the container 1. In this way, the beer will be kept bubbly and sparkling when dispensed from the container 1 by opening of the dispensing valve 3.

In the event of leakage of $CO_2$ from chamber 16 past the valve 24 or O-ring 23 the pressure in the container 1 can only build up to a value as determined by the opening pressure setting of the relief valve 17.

In the form of the pressurizer 30 for container 31 shown in FIG. 4, there is again provided a high pressure vessel 32 which is charged with fluid under high pressure through the inlet check valve 34 and again there is a relief valve 35 corresponding to relief valve 19 for relieving the high pressure chamber 36 in the event of pressure buildup exceeding the setting of said relief valve 35. Instead of employing a bellows-type regulator 24–25 as in FIG. 2, the pressurizer 30 has a diaphragm 37 of which one side is exposed to pressure in the chamber 38 which is communicated by way of the tube 39 with the chamber 40 above the liquid level in the container 31, and of which the other side is exposed to ambient or atmospheric pressure in chamber 41. A spring 42 biases the center portion of the diaphragm 37 downwardly as viewed in FIG. 4, with such force that the discharge check valve 43 is unseated thereby whenever the pressure in chamber 38 drops below a desired value. When the diaphragm 37 is thus urged downwardly, the central portion thereof engages the stem of valve 43 to move it out of engagement with its seat whereby high pressure fluid in the chamber 36 flows into the low pressure chamber 38 and through the float valve tube 39 into the container chamber 40 above the liquid level therein. When the pressure in the container 31 and in the chamber 38 builds up to the desired value (12 to 14 p.s.i. for example), that pressure acting on the underside of the diaphragm 37 will cause it to be deformed upwardly to permit pressure seating of the valve 43. On the other hand, should the pressure in the container 31 and in the chamber 38 rise above a desired maximum value due to leakage of high pressure fluid through valve 43, the diaphragm 37 will be continued to be forced upwardly until the stem of the valve 45 carried by the central portion of the diaphragm assembly engages the cap 46, whereupon the valve 45 will be unseated to vent the chamber 38 to the atmosphere.

Another feature of the FIGS. 4, 5 and 6 pressurizer which is equally applicable to the FIG. 2 pressurizer, is the provision of a self-locking bayonet-type connection wherein radially extending lugs 47 on the pressurizer 30 are engaged under radially inturned lugs 48 formed on the container 31 itself. In making the assembly, the pressurizer 30 is inserted in the container 31 so that notches 49 thereof register with lugs 48 and then the pressurizer is turned clockwise to the FIG. 5 position wherein the lugs 47 are beneath lugs 48 and the stop lugs 50 engage the sides of lugs 48. In order to lock the pressurizer 30 and container 31 against inadvertent separation, one of them, herein the container 31, is formed with a recess 51 to receive the lock plunger 52 which is mounted on the free end of a leaf spring 53 secured in a recess 54 in the underside of the pressurizer boss 55. Thus, when the pressurizer 30 and container 31 are interlocked by the bayonet connection, the leaf spring 53 will urge the lock plunger 52 into the recess 51 so that the pressurizer 30 cannot be turned and removed from the container 31. When the lock plunger 52 is of steel, it may be withdrawn from the recess 51 as by means of a magnet placed near or on the non-magnetic or non-ferrous boss 55, whereupon the pressurizer 30 may be removed from container 31 for refilling of the latter.

From the foregoing description of the present invention, it can be seen that a simple and efficient pressurizer has been devised to maintain a prescribed fluid pressure on a liquid in a container. Another noteworthy feature of the FIG. 2 pressurizer 4 is that the pressure in the chamber 10 is constant at all ambient pressures owing to the use of the sealed bellows 25. Moreover, in all embodiments of the invention herein disclosed the liquid in the pressurized container 1 or 31 never comes into contact with the valves of the pressurizer 4 or 30, and, of course, in the FIG. 2 embodiment, the liquid L in the container 1 does not come into contact with any part of the pressurizer 4.

Other modes of applying the principle of the invention may be employed, change being made as regards the details described, provided the features stated in any of the following claims, or the equivalent of such, be employed.

I therefore particularly point out and distinctly claim as my invention:

1. In combination, a container with a dispensing valve adapted to contain liquid under pressure to be dispensed therefrom by opening said dispensing valve; a high pressure vessel secured in said container in fluid tight relation thereto and having a passage from therewithin leading into said container above the level of the liquid therein, said passage terminating in a float buoyed by liquid in the container and through which fluid from said vessel is introduced into said container above the level of the liquid, said float being valved and effective to permit the flow of such fluid only from said vessel into the container; another valve in said passage to open and close the same; and pressure responsive means exposed to pressure in the container to open said other valve when the fluid pressure in the container is less than a prescribed value to admit fluid under pressure from said vessel into the container to raise the pressure in the latter to such prescribed value.

2. The combination of claim 1 wherein said pressure responsive means comprises a bellows responsive to fluid pressure in said container which expands to open said other valve whenever the fluid pressure in the container is less than such prescribed value.

3. The combination of claim 1 wherein said pressure responsive means comprises a valve actuating member having opposite sides thereof exposed to fluid pressure in the container and to the atmosphere; and spring means biasing said actuating member to open said other valve upon decrease of the fluid pressure in the container to less than such prescribed value.

4. The combination of claim 3 wherein said actuating member carries a third valve which is opened to the atmosphere upon movement of said actuating member against said spring means by fluid pressure in the container exceeding such prescribed value.

5. The combination of claim 1 further including magnetically responsive means effective to lock said vessel and container together upon insertion of said vessel into said container and effective to permit removal of said vessel from said container upon actuation thereof.

References Cited in the file of this patent
UNITED STATES PATENTS

| | | |
|---|---|---|
| 445,257 | Beck | Jan. 27, 1891 |
| 1,959,815 | Corcoran | May 22, 1934 |
| 1,987,323 | Carroll et al. | Jan. 8, 1935 |
| 2,660,343 | Charpiat | Nov. 24, 1953 |
| 2,769,580 | Hudson et al. | Nov. 6, 1956 |
| 2,812,109 | Wentz | Nov. 5, 1957 |